US010356597B2

(12) United States Patent
Prasad et al.

(10) Patent No.: US 10,356,597 B2
(45) Date of Patent: Jul. 16, 2019

(54) TESTING AND VALIDATION OF USER EQUIPMENT FOR A CELLULAR NETWORK

(71) Applicant: Verizon Patent and Licensing Inc., Arlington, VA (US)

(72) Inventors: Abhinav Prasad, Edison, NJ (US); Christopher M. Schmidt, Branchburg, NJ (US); Carol Becht, Boonton, NJ (US); Krishna Pichumani Iyer, Aurora, IL (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 254 days.

(21) Appl. No.: 15/145,481

(22) Filed: May 3, 2016

(65) Prior Publication Data

US 2017/0324617 A1    Nov. 9, 2017

(51) Int. Cl.
| *H04W 8/02* | (2009.01) |
| *H04W 24/02* | (2009.01) |
| *H04L 12/24* | (2006.01) |
| *H04L 12/26* | (2006.01) |
| *H04W 24/06* | (2009.01) |
| *H04W 88/16* | (2009.01) |

(52) U.S. Cl.
CPC .......... *H04W 8/02* (2013.01); *H04L 41/0803* (2013.01); *H04L 43/50* (2013.01); *H04W 24/02* (2013.01); *H04W 24/06* (2013.01); *H04W 88/16* (2013.01)

(58) Field of Classification Search
CPC ..... H04M 3/242; H04W 24/00; H04W 24/06; H04W 8/02; H04W 24/02; H04W 88/16; H04L 41/0803; H04L 43/50
See application file for complete search history.

(56) References Cited

U.S. PATENT DOCUMENTS

| 6,272,450 B1* | 8/2001 | Hill ....................... H04W 24/00 370/241 |
| 8,229,416 B2* | 7/2012 | Akman ................... H04L 43/50 455/419 |
| 8,787,900 B2* | 7/2014 | Amine ............... H04B 17/3911 455/115.1 |
| 2002/0183054 A1* | 12/2002 | Rimoni .............. H04B 17/0085 455/423 |
| 2003/0236089 A1* | 12/2003 | Beyme ............... H04B 17/0087 455/423 |
| 2005/0083068 A1* | 4/2005 | Clarridge ............. G01R 31/026 324/601 |
| 2006/0090100 A1* | 4/2006 | Holzapfel ............. G06F 11/263 714/38.1 |

(Continued)

*Primary Examiner* — Matthew C Sams (57) ABSTRACT

Compatibility and/or compliance testing for a wireless cellular network may be performed using a testing system that includes a device that implements multiple base stations in a single hardware device. Additionally, a network simulation server may simulate a core portion of the wireless cellular network. Test cases, such as test cases defined using a scripting language, may be received and the test cases may be interpreted to obtain configuration information for the testing system. Based on the configuration information, the base stations and the simulated network devices may be initially configured. After configuration, and based on the test case, a UE may be controller to interact with the simulated network in a manner implements the desired compatibility and/or compliance tests.

20 Claims, 8 Drawing Sheets

(56) References Cited

U.S. PATENT DOCUMENTS

| | | | | |
|---|---|---|---|---|
| 2007/0220342 A1* | 9/2007 | Vieira | ............... | G06F 11/3688 |
| | | | | 714/33 |
| 2008/0102822 A1* | 5/2008 | Feng | ............... | H04W 72/082 |
| | | | | 455/425 |
| 2011/0045856 A1* | 2/2011 | Feng | ............... | H04W 72/082 |
| | | | | 455/501 |
| 2011/0092202 A1* | 4/2011 | Mattisson | ............... | H04L 41/12 |
| | | | | 455/425 |
| 2011/0217985 A1* | 9/2011 | Gorokhov | ............... | H04W 24/10 |
| | | | | 455/452.2 |
| 2013/0176940 A1* | 7/2013 | Hohammed | ............... | H04W 24/00 |
| | | | | 370/328 |
| 2013/0316710 A1* | 11/2013 | Maaref | ............... | H04W 16/10 |
| | | | | 455/436 |
| 2014/0080424 A1* | 3/2014 | Aoki | ............... | H04W 24/06 |
| | | | | 455/67.14 |
| 2014/0357298 A1* | 12/2014 | Koskinen | ............... | G01S 5/0027 |
| | | | | 455/456.1 |
| 2015/0081758 A1* | 3/2015 | Lee | ............... | H04L 43/50 |
| | | | | 709/201 |
| 2015/0134779 A1* | 5/2015 | Thompson | ............... | H04L 67/06 |
| | | | | 709/219 |
| 2015/0237615 A1* | 8/2015 | Flynn | ............... | H04W 64/003 |
| | | | | 455/418 |

\* cited by examiner

TESTING AND VALIDATION OF USER EQUIPMENT FOR A CELLULAR NETWORK

BACKGROUND

A telecommunications operator, before deploying user equipment (UE), such as smartphones or other mobile devices, to a network, may require that the UE be tested to operate with the network. In particular, the UE may be tested to ensure that the UE passes conformance tests with respect to the network equipment that makes up the network. The conformance tests may be written in a testing language, such as the Testing and Test Control Notation version 3 (TTCN-3) scripting language. Current techniques and systems for applying TTCN-3 test cases for a UE can be unduly expensive, potentially requiring a complex and expensive hardware testing setup.

DETAILED DESCRIPTION OF PREFERRED EMBODIMENTS

The following detailed description refers to the accompanying drawings. The same reference numbers in different drawings may identify the same or similar elements.

Implementations described herein relate to devices and techniques for performing compatibility and/or compliance testing for a wireless cellular network. In one implementation, UEs may be tested using a suite of test cases that are described using a testing language. In some implementations, the testing language may be the TTCN-3 scripting language or some other language. The testing system may include hardware for implementing multiple base stations in a single hardware device, called a base station device herein. The base station device may be connected, such as via an Ethernet or Universal Serial Bus (USB) connection, to a network simulation server. The network simulation server may simulate a core portion of the wireless cellular network, such as simulation of the network devices that perform coordination and control functions for the network.

The network simulation server may receive test cases, such as test cases defined using a scripting language, and interpret and/or translate the test cases to obtain configuration information for the testing system. Based on the configuration information, the network devices, the base stations, and/or the UE may be initially configured. After configuration, the network simulation server may further execute the test cases to control the UE to interact with the simulated network in a manner implements the desired compatibility and/or compliance tests.

Figure 1:
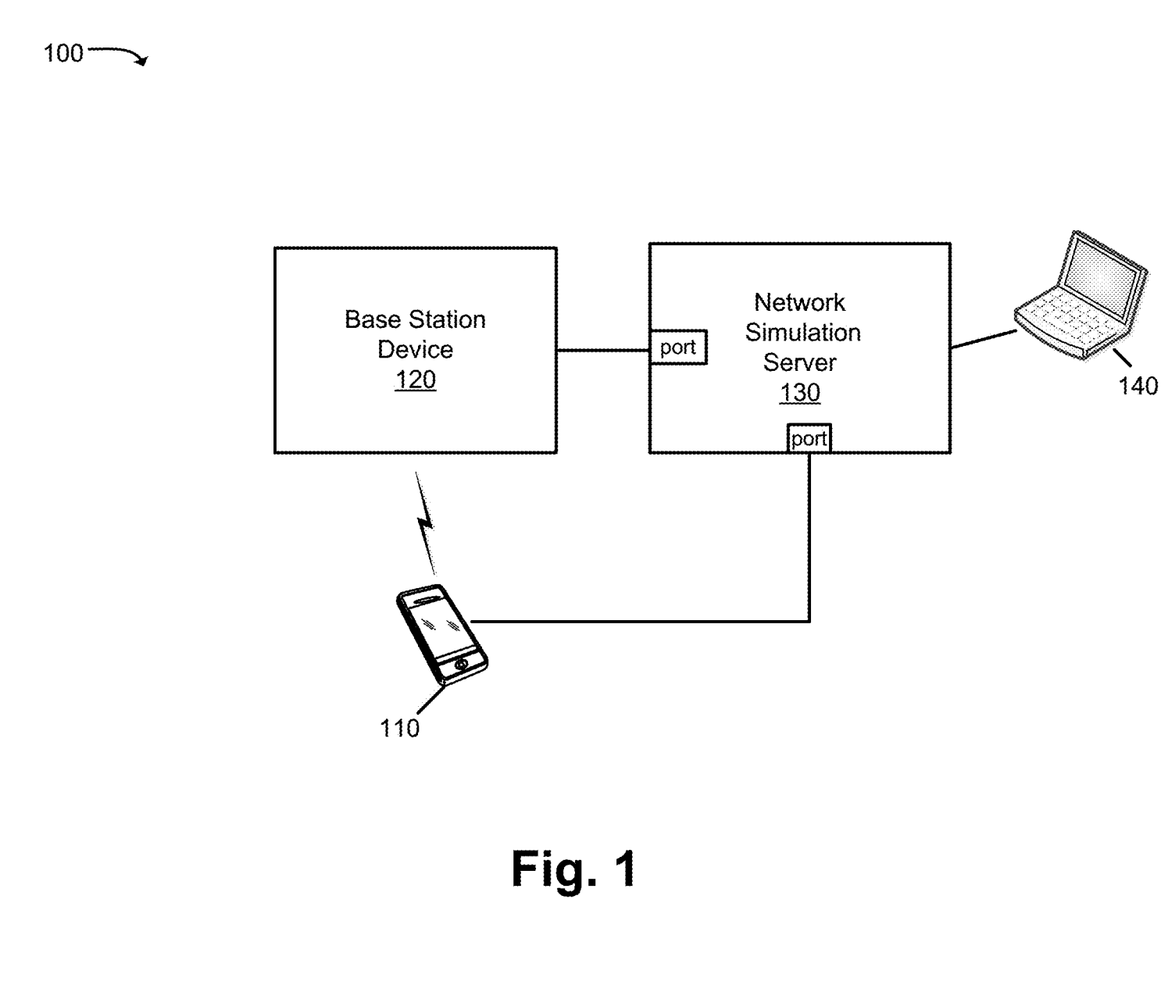
FIG. 1 is a diagram illustrating an example test system.

FIG. 1 is a diagram illustrating an example test system 100. As shown, test system 100 may include UE 110, base station device 120, network simulation server 130, and a personal computer 140.

UE 110 may include any computation and communication device that is capable of communicating with one or more networks (e.g., a wireless cellular network). For example, UE 110 may include a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a set-top device ("STD"), a personal gaming system, a wearable device, and/or another type of computation and communication device. In some cases, UE 110 may include a machine-to-machine (M2M) or Internet-of-Things (IoT) device.

UE 110 may be a UE, such as a smartphone, that is to be tested for compatibility/compliance for operation with a wireless cellular network. For example, when a manufacturer releases a new UE model, the operator of the wireless cellular network may desire to test the UE before allowing the UE to be used with the operator's network.

Base station device 120 may include a communication device that includes a radio interface. In the context of a Third Generation Partnership Project (3GPP) network, a base station may be referred to as an Evolved Node B (eNB). In one implementation, base station device 120 may include multiple antenna and transceiver elements, each corresponding to one eNB, and base station device 120 may be implemented as a single "box" or unit (i.e., within a single physical enclosure). Each of the eNBs, implemented by base station device 120, may be small cell eNBs. A small cell eNB may be generally identical (e.g., from a protocol perspective) to a macrocell eNB, but may use lower power communications and thus have a more limited coverage area than a macrocell eNB. One example implementation of base station device 120 is described in more detail below with reference to FIG. 2.

Network simulation server 130 may include a computing device, such as a personal computer, laptop computer, or other computing device. Network simulation server 130 may include a number of software components that provide simulation and testing services. For example, network simulation server 130 may implement a network simulator that simulates the operation of a core portion of a wireless cellular network. For example, for a 3GPP network, the network simulator may simulate Mobility Management Entities (MMEs), Packet Data Network Gateways (PGWs), Serving Gateways (SGWs), and Internet Protocol (IP) Multimedia (IMS) network devices. Network simulation server 130 may include a translator/controller component to interpret input test cases (e.g., TTCN-3 test cases) and correspondingly configure and control test system 100. Network simulation server 130 may be connected to UE 110 and base station device 120 via physical connections, such as USB or Ethernet connections (illustrated as "ports" in FIG. 1). One example implementation of network simulator server 130 is described in more detail below with reference to FIG. 3.

Personal computer 140 may include a computing device, such as a desktop or laptop computer, through which a user (e.g., a technician) may conduct and analyze tests performed in test system 100. Personal computer 140 may provide a user interface through which the user may initiate the tests, view results of the tests, and analyze results of the test. In some implementations, the user interface functions implemented by personal computer 140 may be performed by network simulation server 130. In other words, network simulation server 130 and personal computer 140 may be implemented as a single computing device (e.g., a desktop or laptop computer).

Figure 2:
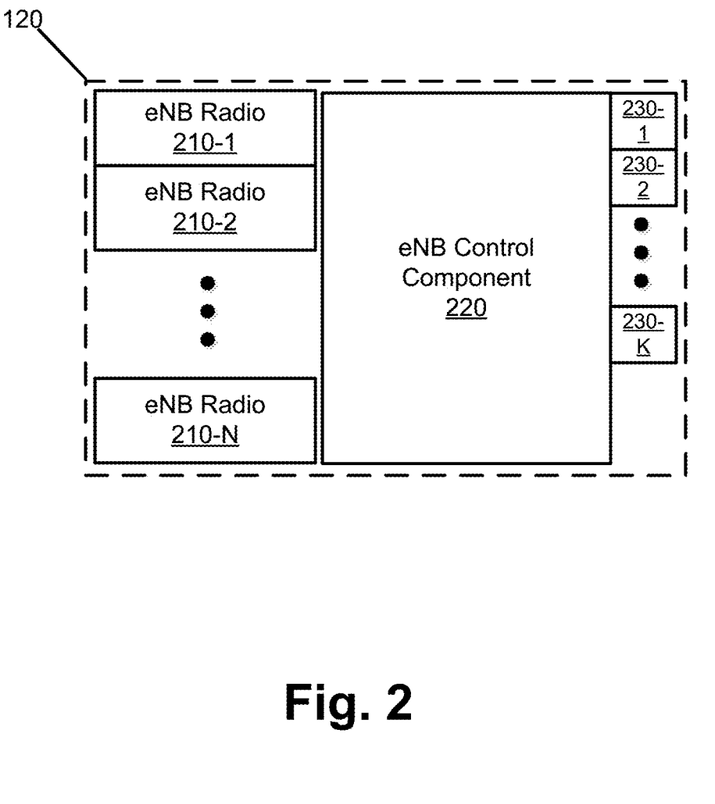
FIG. 2 is a diagram illustrating an example implementation of base station device in the test system of FIG. 1.

FIG. 2 is a diagram illustrating an example implementation of base station device 120 in additional detail. As shown, base station device 120 may include a number of radios, labeled as eNB radio 210-1 through 210-N. Each of eNB radios 210 may correspond to one or more of antenna elements, transceiver circuitry, radio frequency (RF) circuitry, or baseband circuitry that is used to implement the radio interface for an eNB. Control and/or configuration of higher-layer processes, that are performed by eNBs, may be, for example, implemented by shared processing logic, such as eNB control component 220. Alternatively, eNB control component 220 may be separately provided for each eNB radio 210. Additionally, one or more ports, labeled as ports 230-1 to 230-K, may be included as part of base station device 120. Ports 230 may be, for example, USB ports, Ethernet ports, or other types of ports. In some implementations, ports 230 may be provided via wireless interfaces (e.g., Bluetooth, etc.).

In one implementation, eNB radios 210 may each be designed to implement radio circuitry for a small cell eNB. In general, a small cell eNB may be functionally similar to a macrocell eNB but be designed to use less power and to thus provide coverage over a smaller coverage area.

In some implementations, base station device 120 may be implemented as a single physical unit. For example, base station device 120 may be included within a single housing, such as a metal or plastic housing, or a combination thereof, that can be connected to a personal computer, such as via a USB port or ports. By implementing multiple small cells within a single physical unit, different radio interaction and interference test conditions (e.g., multi-path interference and fading scenarios, handover scenarios, etc.) can be implemented.

Figure 3:
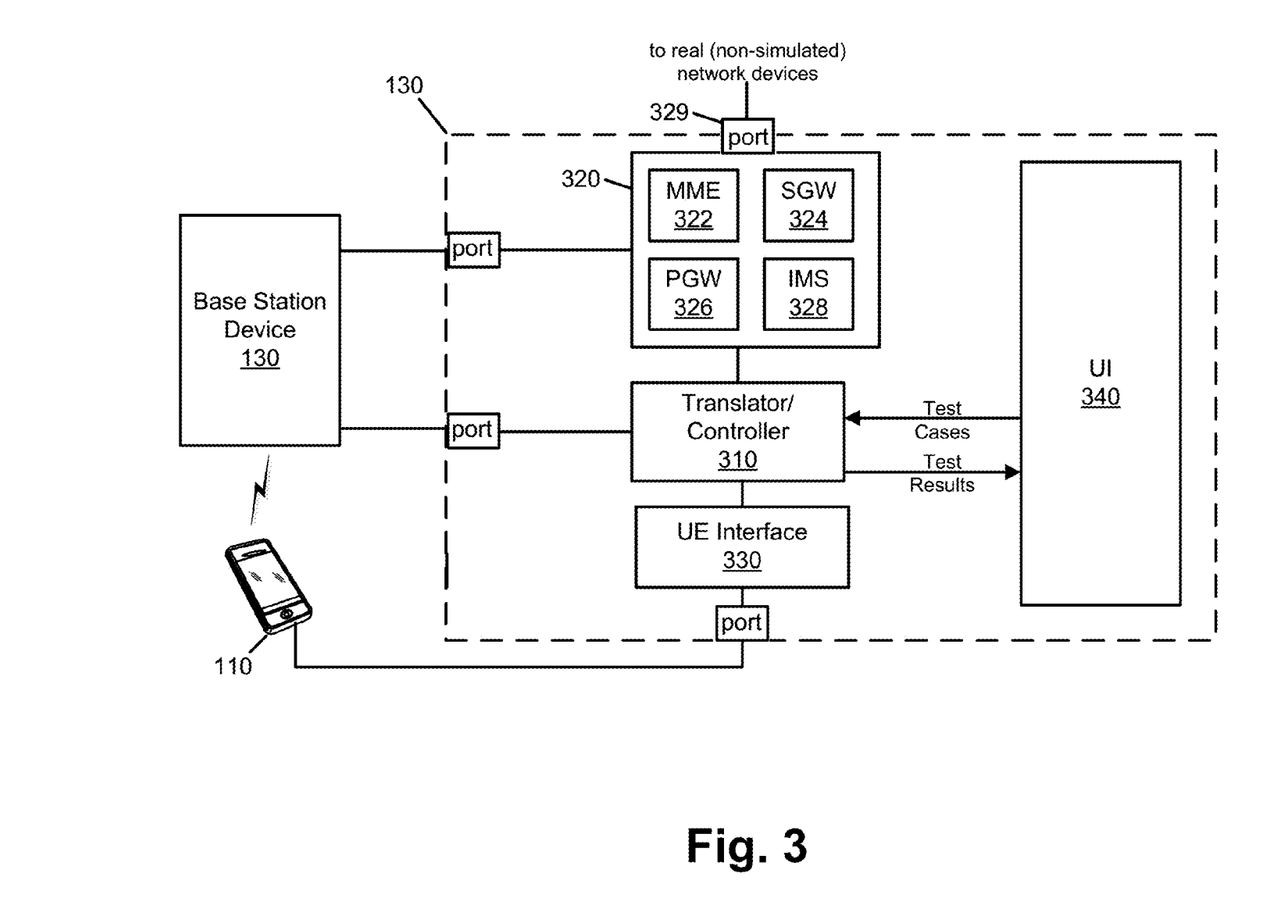
FIG. 3 is a diagram illustrating an example implementation of network simulation server in the test system of FIG. 1.

FIG. 3 is a diagram illustrating an example implementation of network simulation server 130 in additional detail. Network simulation server 130 may be implemented as a computing device, such as a personal computer, laptop, and/or server device that implements a number of software processes. As shown, software processes may include translator/controller 310, network simulator 320, UE interface 330, and UI 340. The various processes may communicate with one another (e.g., through internal API calls), and with external devices such as UE 110 and base station device 130 (e.g., via USB and/or Ethernet ports).

Translator/controller 310 may include one or more processes to receive test cases, such as test cases defined using a formal testing language such as TTCN-3 and/or TTCN-3 using Unified Modeling Language (UML) (TTCN-3/UML). Translator/controller 310 may determine configuration information, for base station device 130 and/or network simulator 320, corresponding to the test cases. For example, in one implementation, network simulator 320 may be a network simulator that is implemented using the C/C++ programming language. In this case, translator/controller 310 may generate C/C++ configuration files that are used to configure the simulated network devices, of network simulator 320, to the configurations required by the test case. Instantiation of network simulator 320 may thus use the C/C++ configuration files to configure the simulated network devices to the desired configuration. Similarly, translator/controller 310 may generate C/C++ configuration files to configure the eNBs implemented by base station device 130. In other possible implementations, configuration of network simulator 320 and base station device 130 may be implemented using configuration information other than C/C++ configuration files. In some implementations, translator/controller 310 may be capable of dynamically configuring certain elements of the simulated system, such as by dynamically configuring eNBs in response to performance indicators.

Translator/controller 310 may also control the run-time operation of the test cases, such as by providing control signals (stimuli) to: eNBs (of base station device 120), network devices simulated by network simulator 320, and/or UE 110 (e.g., via UE interface 330). The control signals may be dictated by the test cases. Translator/controller 310 may also receive results, of the run-time operation of the test cases, from the eNBs, network devices simulated by network simulator 320, and/or UE 110, and may provide the results to UI 340. The results may relate to, for example, operation, data throughput, error conditions, signal interference, or other performance indicators of the simulated system. In general, translator/controller 310 may receive results relating to any performance indicators or key performance indicator (KPI) of the simulated system. The results may be forwarded to UI 340 for storage and/or analysis.

Network simulator 320 may include one or more processes to simulate a core portion of a wireless cellular network. A wireless cellular network may include a radio access network (RAN) portion and a core portion. In test system 100, the RAN may be implemented by the eNBs of base station device 120. The core portion may include an Evolved Packet Core (ePC) based on 3GPP standards. The ePC may be based on a flat, Internet Protocol (IP) packet-switched architecture in which the user plane and control plane traffic are separated. As illustrated, a number of different network devices/functions are defined in the ePC. Network simulator 320 may implement the network devices of the ePC, such as MME 322, SGW 324, and PGW 326. Additionally, other networks or functions, such as IMS 328, may also be implemented by network simulator 320. Each of the devices/functions, that are implemented by network simulator 320, may be based on the actual software stack that would be used in a deployed cellular wireless network. For example, the functionality of MME 322 may be implemented using the software stack of an MME that would be implemented in an actual production wireless cellular network.

In one implementation, network simulator 320 may run each of MME 322, SGW 324, PGW 326, and IMS 328 as an independent process, in which communications between these processes, and communications with external entities, may be implemented as inter-process communications that are facilitated by control functionality of network simulator 320. For example, packets emitted by MME 322, and destined for SGW 324, may be input to SGW 324 in a manner that, from the perspective of SGW 324, acts as if the packets were transmitted over a physical communication medium (e.g., a fiber optic cable).

MME 322, as implemented by network simulator 320, may perform operations to register UE 110 with the simulated wireless telecommunications network, to establish bearer channels (e.g., traffic flows) associated with a session with UE 110, to hand off UE 110 to different eNBs, and/or to perform other operations. SGW 324 as implemented by network simulator 320, may perform operations to aggregate traffic received from one or more eNBs and may send the aggregated traffic to an external network or device via PGW 326. IMS 328, as implemented by network simulator 320, may provide for the delivery of IP multimedia services to UEs 110. IMS 328 may use Session Initiation Protocol (SIP) as the control plane signaling mechanism for the multimedia services.

In some implementations, some or all of the functions simulated by network simulator 320 may be external processes and/or devices, such as "actual" (i.e., non-simulated) network devices or an external IMS. For example, a port, labeled as port 329, may include an Ethernet port that may connect to one or more devices or networks that may provide functionality that is needed by a particular test case. As one example, instead of using a simulated IMS 328, an "actual" IMS network (or an IMS network simulated at another device), may be used. In this manner, test cases can be executed using a combination of simulated and non-simulated (i.e., production) devices/systems.

UE interface 330 may provide an interface for UE 110. In one implementation, UE interface 330 may control, using AT commands, UE 110. AT commands are a known command protocol for controlling communication devices such as modems and other devices. In some implementations, different UE interfaces may be implemented for different manufacturers and/or models of UEs. In this situation, UE interface 330 may act as an abstraction layer for controlling and communicating with UE 110. Translator/controller 310 may thus use a standardized interface to interact with UE interface 330 (and to thus control UE 110).

UI 340 may include a user interface through which a user, such as a technician, may initiate the providing of test cases to test system 100. For example, via UE 340, the technician may input one or more test cases that are to be simulated. Results of the simulation may be received and displayed to the technician via UI 340. In some implementations, UI 340 may include analysis tools through which the technician may analyze and/or output the results.

Although illustrated, in FIG. 3, as part of network simulation server 130, UI 340 may be implemented either at network simulation relation server 130 or remotely at another device, such as personal computer 140. For simplicity, UE 340 will be described herein as being implemented at network simulation server 130.

Figure 4:
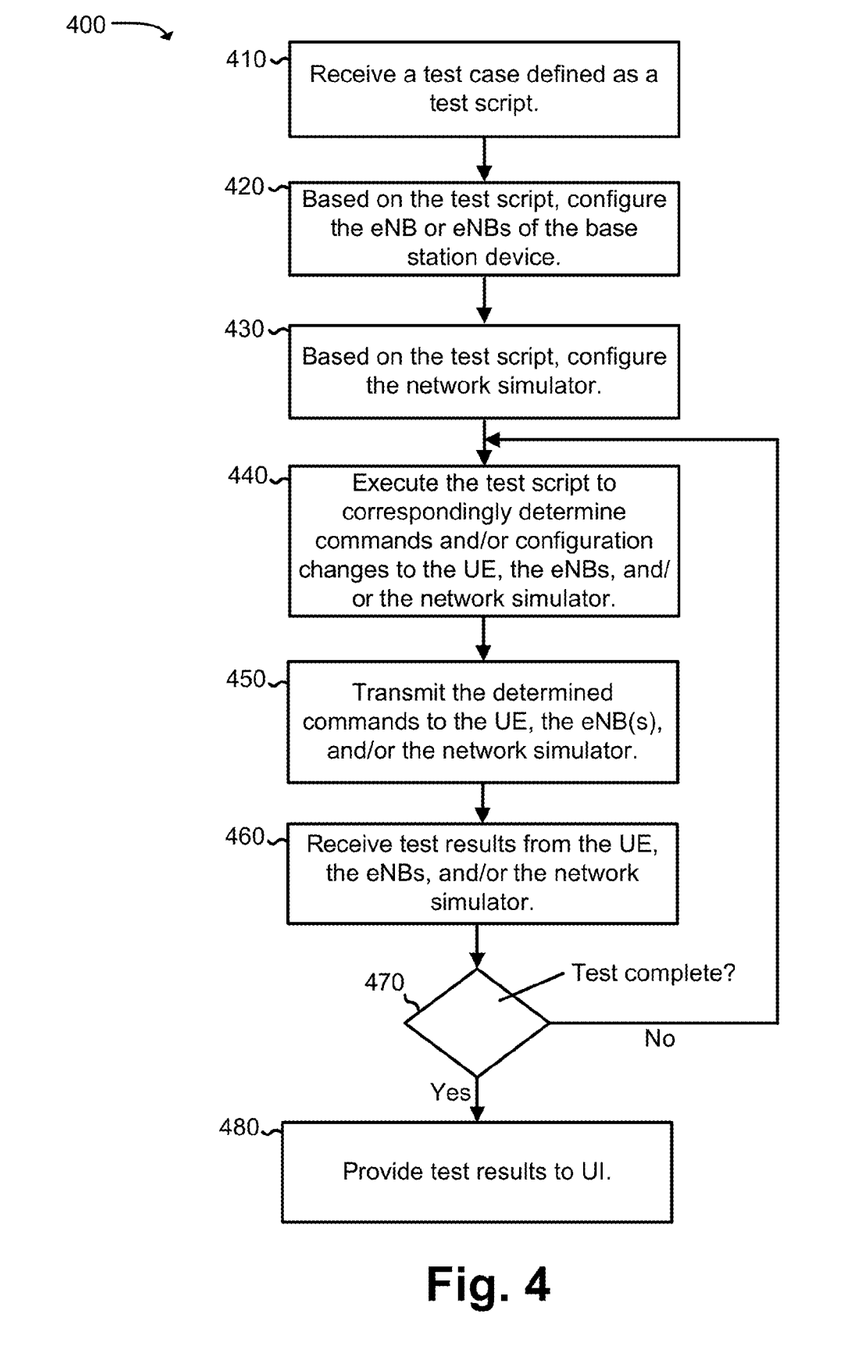
FIG. 4 is a flowchart illustrating an example process for performing conformance testing for a User Equipment (UE)

FIG. 4 is a flowchart illustrating an example process 400 for performing conformance testing for a UE. Some or all of process 400 may be performed by translator/controller 310 of network simulation server 130.

As previously mentioned, network conformance testing for a UE may be based on a number of test cases, such as test cases that are defined using a testing language such as the TTCN-3 scripting language. In some situations, a number of standardized test cases, for a particular network architecture, may be published by a standardization body. For example, a number of conformance tests may be published for various versions of the standards published by 3GPP. The conformance tests may be designed to test that the interaction of a particular UE (e.g., a particular UE model), with how the infrastructure of the cellular wireless network, conforms to the requirements of the network.

Process 400 may include receiving a test case defined as a test script (block 410). The test script may be, for example, a TTCN-3 script that implements a particular test scenario (test case). The test scenario may, for example, test the operation of the UE in performing handover operations, attaching to the network, establishing bearer connections, or any other operation that may be performed by the UE and that involves interaction with the cellular wireless network.

In one implementation, a technician may control the inputting of a test script, to translator/controller 310, via UE 340. For example, the technician may individually control the inputting of test scripts to translator/controller 310. Alternatively or additionally, a suite of test scripts may be selected, by the technician, and automatically and sequentially input to translator/controller 310.

Process 400 may further include, based on the received test script, configuring the eNB (or eNBs) corresponding to base station device 120 (block 420). In one implementation, translator/controller 310 may translate and/or interpret the test script to determine a configuration state that is specified by the test script and that applies to the eNBs of base station device 130. For example, the test script may indicate that the eNBs should use particular protocols, operate at particular power levels, communicate with particular devices (e.g., simulated by network simulator 320), etc. Thus, translator/controller 310 may operate to determine, from the test script, the basic network configuration or provisioning conditions that should be provided by the eNBs. In one implementation, as previously mentioned, the configuration information may be expressed as a C/C++ configuration file. This may be particularly appropriate when the control logic of the eNBs, provided by base station device 130, is implemented using C/C++ code. For other implementations, the configuration information may be expressed using other formats.

Process 400 may further include, based on the received test scripts, configuring the network simulator (block 430). In a manner similar to the operation of block 420, translator/controller 310 may translate and/or interpret the test script to determine a configuration state that is specified by the test script and that applies to the network devices that are simulated by network simulator 320. For example, the test scripts may indicate that the network devices are to use particular protocol stacks, use particular parameters for the protocols, use particular error correcting techniques, etc. The configuration information for network simulator 320 may be expressed as a C/C++ configuration file. This may be particularly appropriate when the network devices simulated by network simulator 320 are implemented using C/C++ code. For other implementations, the configuration information may be expressed using other formats.

Process 400 may further include executing the test script (block 440). Execution of the test script may correspondingly result in the generation of commands and/or configuration changes for the UE, the eNB(s), and/or the devices of the network cellular. The commands and/or configuration changes may correspond to run-time commands in the operation of the test. The test script may indicate that certain network events are to occur at certain times. For example, varying network congestion levels, radio interference levels, or other events, may be dictated by the test script to occur at particular times. Additionally, with respect to UE 110, the test script may indicate that certain commands are to be performed at UE 110 at certain times. For example, UE 110 may be required to place a telephone call at a certain point during execution of the test script, initiate the creation of data bearers, or perform other actions at designated points in time. Based on the test script, translator/controller 310 may determine appropriate commands that can be used to implement the actions in the testing system. For example, translator/controller 310 may determine the corresponding AT commands that will cause UE 110 to perform the required actions (e.g., place a call, etc.). As another example, translator/controller 310 may generate commands, for base station device 120, to implement the required actions at the appropriate eNBs, and/or generate commands, for network simulator 320, to implement the required actions at the appropriate network devices.

Process 400 may further include transmitting the determined commands, at the appropriate times (as indicated by the test script), to the UE, eNBs, and/or the network simulator (block 450). Commands for UE 110 may be relayed through UE interface 330. Commands for the eNBs may be transmitted, for example, via a USB or Ethernet port, to base station device 130. Commands for network simulator 320 may be directly communicated, such as via the use of an inter-process API, between translator/controller 310 and network simulator 320. In this manner, the simulation, indicated by the test script, may be executed.

Process 400 may further include receiving test results from the UE, base station device 130, and/or from network simulator 320. The test results may include information relating to, for example, operation, data throughput, error, signal interference, or other performance indicators of the simulated system (e.g., of UE 110, base station device 120, and/or network simulator 320).

The results may be received by translator/controller 310. Translator/controller 310 may forward the results to UI 340 for storage, analysis, and or further processing by a technician. For example, the received test results may be processed by an analytic engine, such as to perform automated data analysis or data presentation functions, for presentation to the technician.

Blocks 440 through 460 may be repeated until the test is complete (block 470). When the test is complete, any final test results may be provided to the UE (block 480). That is, translator/controller 310 may forward an indication, to UI 340, that the test script has completed running and may forward any results relating to execution of the test script.

Figure 5:
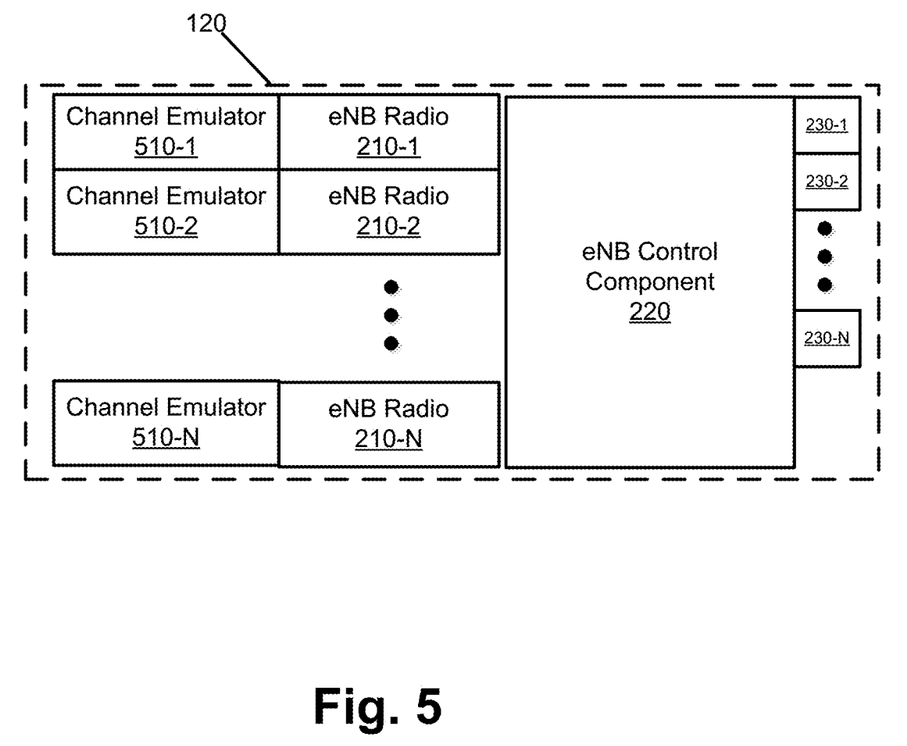
FIG. 5 is a diagram illustrating a second alternative possible implementation of the base station device of FIG. 1.

FIG. 5 is a diagram illustrating a second alternative possible implementation of base station device 120. As shown, in this implementation, base station device 120 may additionally include or be connected to a number of Radio Frequency (RF) channel emulators, labeled as channel emulators 510-1 through 510-N.

Each channel emulator 510 may operate to create real-world RF environmental effects in a test setting. For example, channel emulator 510 may create multipath and fading effects as needed. By using channel emulators 510, test system 100 can test, in a laboratory setting, more advanced radio frequency test conditions. Multiple channel emulators 510, corresponding to multiple eNBs 210, may further be used to increase the flexibility of the RF simulations. In operation, translator/controller 310 may configure and control channel emulators 510 as part of the execution of a test script.

Figure 6:
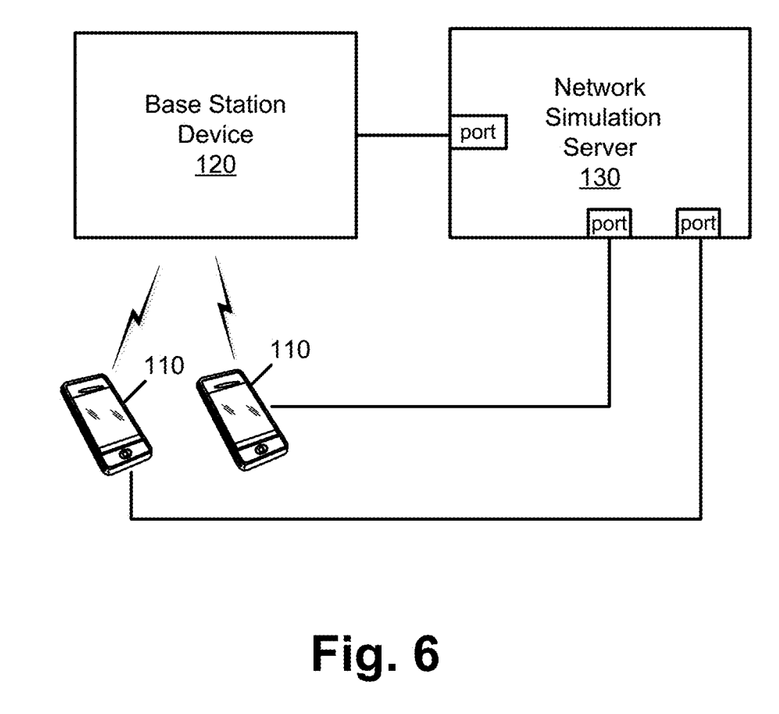
FIG. 6 is a diagram illustrating an example of a test system in which multiple UEs may be simultaneously tested.

FIG. 6 is a diagram illustrating an example of a test system, similar to test system 100, in which multiple UEs 110 may be simultaneously tested. Simultaneous testing of multiple UEs may be desirable, for example, in the testing of communications between UEs, testing of interference caused by between UEs, or for other reasons. In some situations, it may be desirable to simultaneously run a test suite against multiple models of UEs to decrease the total testing time (i.e., to perform conformance testing in parallel).

As shown in FIG. 6, two UEs 110 are illustrated as being connected to network simulation server 130. For example, each of the two UEs may be connected, and controlled, via a USB port. In this situation, UI interface 330 may control each of the UEs.

Figure 7:
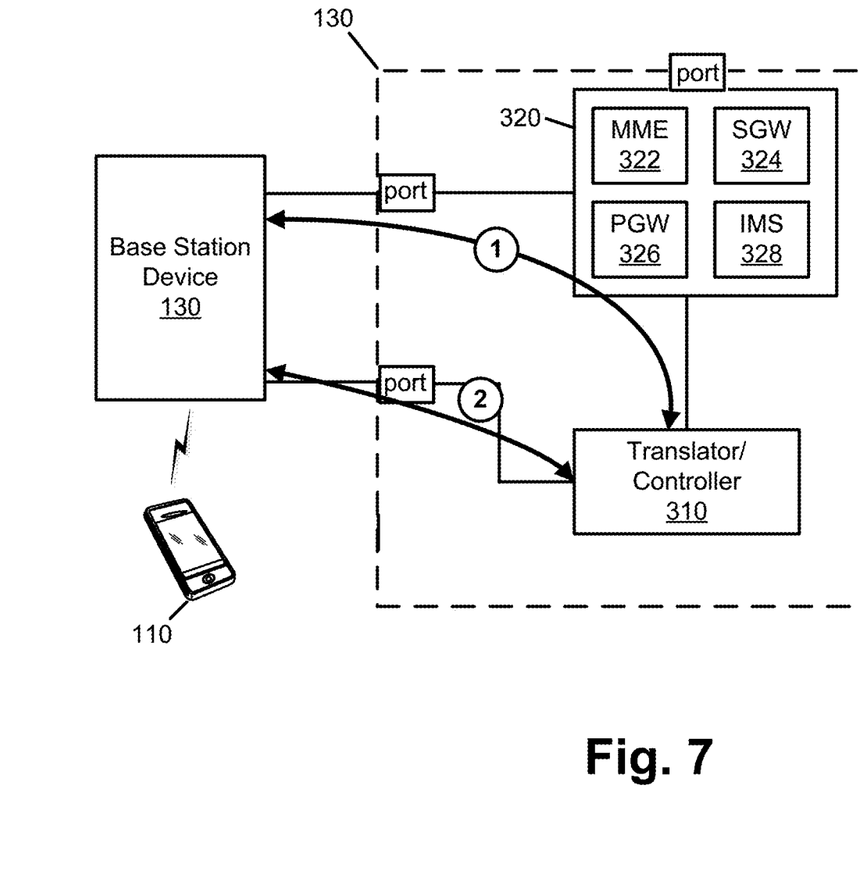
FIG. 7 is a diagram illustrating communication of commands using eNBs.

In the description above, commands for UE 110 were described as being transmitted, to the UE, via a connection, such as a USB connection. Alternatively or additionally, in some implementations, instead of using a separate connection to the UE, commands for the UE may be transmitted through the RAN of the cellular wireless network. FIG. 7 is a diagram illustrating communication of commands, to UE 110, using eNBs (e.g., via the RAN of the cellular wireless network).

As shown in FIG. 7, translator/controller 310, instead of transmitting UE commands via a separate port, such as a USB port, may forwarded the commands to base station device 130, for communication, to UE 110, via the wireless interface. In one implementation, translator/controller 310 may route the UE commands through the simulated core of the cellular wireless network (at 1). Alternatively, translator/controller 310 may route the UE commands directly to eNBs of base station device 130 (at 2). In this case, the UE commands may be out-of-band with respect to the normal operation of the simulated cellular wireless network.

Figure 8:
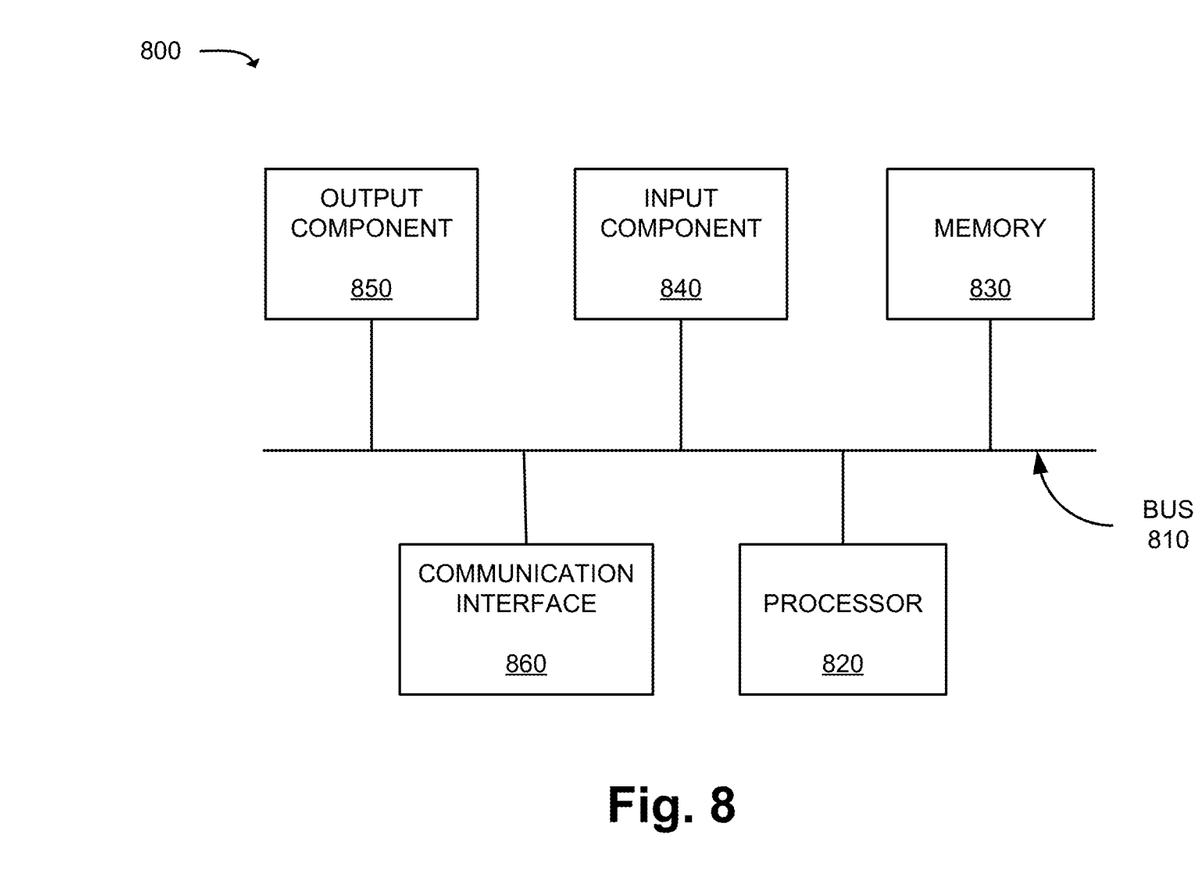
FIG. 8 is a diagram of example components of a computing device.

FIG. 8 is a diagram of example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing circuitry that may interpret and execute instructions, which may generally be referred to as logic or processing logic herein. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface, a radio interface, and an Ethernet interface.

Device 800 may include logic to perform certain operations relating to one or more processes described above. For example, device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, in some implementations, various techniques, some examples of which have been described above, may be used in combination, even though such combinations are not explicitly discussed above. Furthermore, some of the techniques, in accordance with some implementations, may be used in combination with conventional techniques.

Additionally, while series of blocks have been described with regard to FIG. 4, the order of the blocks and/or signals may be modified in other implementations. Further, non-dependent blocks and/or signals may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device for testing User Equipment (UE) for compliance with a cellular wireless network, the device comprising logic to:
   receive a test script that uses Testing and Test Control Notation Version 3 (TTCN-3) to specify configuration information describing an initial configuration of the cellular wireless network, the test script defining a test relating to operation of the UE in the cellular wireless network, and the configuration information including:
      configuration information relating to an initial configuration of a plurality of evolved Node Bs (eNBs) associated with a Radio Access Network (RAN), and
      configuration information relating to an initial configuration of a core portion of the cellular wireless network, the core portion of the cellular wireless network being implemented via a simulation of an operation of one or more network devices;
   translate the TTCN-3 test script to generate a C/C++ configuration file that includes the configuration information specified by the TTCN-3 test script;
   cause configuration of the plurality of eNBs, based on the configuration information, in the C/C++ configuration file, relating to the initial configuration of the plurality of eNBs, and configuration of the one or more network devices, based on the configuration information, in the C/C++ configuration file, relating to the one or more network devices;
   execute the test script to determine a set of run-time commands, for the UE, to implement the test, wherein the determined test script indicates designated particular times for a plurality of run-time commands, of the determined set of run-time commands, wherein a first one of the run-time commands is associated with a first designated time, and wherein a second one of the run-time commands is associated with a second designated time that is different from the first designated time,
      wherein the UE implements the test by executing the determined run-time commands,
      wherein executing the first run-time command causes the UE to communicate wirelessly with at least one of the eNBs, of the plurality of eNBs, at the first designated particular time, and
      wherein executing the second run-time command causes the UE communicate wirelessly with the at least one of the eNBs, of the plurality of eNBs, at the second designated particular time; and receive test results, relating to the implementation of the test by the UE, wherein the test results are based on the wireless communication between the UE and the at least one eNB, wherein the test results include information relating to conditions of an air interface between the UE and the at least one eNB, the test results being received from:
the UE,
the plurality of eNBs, and
the core portion of the cellular wireless network.

2. The device of claim 1, wherein the plurality of eNBs include small cell eNBs that are implemented within a single physical enclosure.

3. The device of claim 2, further comprising:
a first Universal Serial Bus (USB) or Ethernet port to connect to the single physical enclosure, and
a second USB port to which the UE is connected, wherein the second USB port is used for communications between the device and the UE.

4. The device of claim 1, wherein the simulation of the operation of the one or more network devices includes simulation of a Mobility Management Entity (MME).

5. The device of claim 1, wherein the UE is a first UE, wherein the at least one eNB includes a first eNB, and wherein the plurality of eNBs includes at least a second eNB that is communicatively coupled to a second UE,
wherein the test results further indicate a measure of interference, of communications associated with the first UE, that is caused by the second UE.

6. The device of claim 4, wherein the simulation of the operation of the one or more network devices further includes simulation of a Serving Gateway (SGW).

7. The device of claim 6, wherein the simulation of the operation of the one or more network devices further includes simulation of one or more Internet Protocol (IP) Multimedia (IMS) network devices.

8. The device of claim 7, wherein the simulation of the operation of the one or more network devices further includes simulation of a Packet Data Network Gateway (PGW).

9. A method for testing User Equipment (UE) for compliance with a cellular wireless network, the method comprising:
receiving a test script that uses Testing and Test Control Notation Version 3 (TTCN-3) to specify configuration information describing an initial configuration of the cellular wireless network, the test script defining a test relating to operation of the UE in the cellular wireless network, and the configuration information including:
configuration information relating to an initial configuration of a plurality of evolved Node Bs (eNBs) associated with a Radio Access Network (RAN), and
configuration information relating to an initial configuration of a core portion of the cellular wireless network, the core portion of the cellular wireless network being implemented via a simulation of an operation of one or more network devices;
translating the TTCN-3 test script to generate a C/C++ configuration file based on the configuration information specified by the TTCN-3 test script;
causing configuration of the plurality of eNBs, based on the configuration information, in the C/C++ configuration file, relating to the initial configuration of the plurality of eNBs, and configuration of the one or more network devices, based on the configuration information, in the C/C++ configuration file, relating to the one or more network devices;
executing the test script to determine a set of run-time commands, for the UE, to implement the test, wherein the determined test script indicates designated particular times for a plurality of run-time commands, of the determined set of run-time commands, wherein a first one of the run-time commands is associated with a first designated time, and wherein a second one of the run-time commands is associated with a second designated time that is different from the first designated time,
wherein the UE implements the test by executing the determined run-time commands,
wherein executing the determined run-time commands causes the UE to communicate wirelessly with at least one of the eNBs, of the plurality of eNBs, at the first designated particular time, and
wherein executing the second run-time command causes the UE communicate wirelessly with the at least one of the eNBs, of the plurality of eNBs, at the second designated particular time; and
receiving test results, relating to the implementation of the test by the UE, wherein the test results are based on the wireless communication between the UE and the at least one eNB, wherein the test results include information relating to conditions of an air interface between the UE and the at least one eNB, the test results being received from:
the UE based on the execution of the run-time commands,
the plurality of eNBs, and
the core portion of the cellular wireless network.

10. The method of claim 9, wherein the plurality of eNBs include small cell eNBs that are implemented within a single physical enclosure.

11. The method of claim 9, wherein the simulation of the operation of one or more network devices includes simulation of a Mobility Management Entity (MME).

12. The method of claim 9, wherein the UE is a first UE, wherein the at least one eNB includes a first eNB, and wherein the plurality of eNBs includes at least a second eNB that is communicatively coupled to a second UE,
wherein the test results further indicate a measure of interference, of communications associated with the first UE, that is caused by the second UE.

13. The method of claim 11, wherein the simulation of the operation of the one or more network devices further includes simulation of:
a Serving Gateway (SGW),
a Packet Data Network Gateway (PGW), and
one or more Internet Protocol (IP) Multimedia (IMS) network devices.

14. A non-transitory computer-readable medium containing program instructions for testing User Equipment (UE) for compliance with a cellular wireless network, the program instructions causing one or more processors to:
receive a test script that uses Testing and Test Control Notation Version 3 (TTCN-3) to specify configuration information describing an initial configuration of the cellular wireless network, the test script defining a test relating to operation of the UE in the cellular wireless network, and the configuration information including:
configuration information relating to an initial configuration of a plurality of evolved Node Bs (eNBs) associated with a Radio Access Network (RAN), and
configuration information relating to an initial configuration of a core portion of the cellular wireless network, the core portion of the cellular wireless network being implemented via a simulation of an operation of one or more network devices;

translate the TTCN-3 test script to generate a C/C++ configuration file based on the configuration information specified by the TTCN-3 test script;

cause configuration of the plurality of eNBs, based on the configuration information, in the C/C++ configuration file, relating to the initial configuration of a plurality of eNBs, and configuration of the one or more network devices, based on the configuration information, in the C/C++ configuration file, relating to the one or more network devices;

execute the test script to determine a set of run-time commands, for the UE, to implement the test by executing the run-time commands, wherein the determined test script indicates designated particular times for a plurality of run-time commands, of the determined set of run-time commands, wherein a first one of the run-time commands is associated with a first designated time, and wherein a second one of the run-time commands is associated with a second designated time that is different from the first designated time, wherein executing the first run-time command causes the UE to communicate wirelessly with at least one of the eNBs, of the plurality of eNBs, at the first designated particular time, and wherein executing the second run-time command causes the UE communicate wirelessly with the at least one of the eNBs, of the plurality of eNBs, at the second designated particular time; and receive test results, relating to the implementation of the test by the UE, wherein the test results are based on the wireless communication between the UE and the at least one eNB, wherein the test results include information relating to conditions of an air interface between the UE and the at least one eNB, the test results being received from:
the UE,
the plurality of eNBs, and
the core portion of the cellular wireless network.

15. The non-transitory computer-readable medium of claim 14, wherein the plurality of eNBs include small cell eNBs that are implemented within a single physical enclosure.

16. The non-transitory computer-readable medium of claim 14, wherein the simulation of the operation of one or more network devices includes simulation of a Mobility Management Entity (MME).

17. The non-transitory computer-readable medium of claim 14, wherein the UE is a first UE, wherein the at least one eNB includes a first eNB, and wherein the plurality of eNBs includes at least a second eNB that is communicatively coupled to a second UE,
wherein the test results further indicate a measure of interference, of communications associated with the first UE, that is caused by the second UE.

18. The non-transitory computer-readable medium of claim 16, wherein the simulation of the operation of the one or more network devices further includes simulation of a Serving Gateway (SGW).

19. The non-transitory computer-readable medium of claim 18, wherein the simulation of the operation of the one or more network devices further includes simulation of one or more Internet Protocol (IP) Multimedia (IMS) network devices.

20. The non-transitory computer-readable medium of claim 19, wherein the simulation of the operation of the one or more network devices further includes simulation of a Packet Data Network Gateway (PGW).

* * * * *